Patented Nov. 16, 1937

2,099,047

UNITED STATES PATENT OFFICE 2,099,047

FLEXIBLE ARTICLES

George Burt Bradshaw, Wilmington, Del., assignor to E. I. du Pont de Nemours & Company, Wilmington, Del., a corporation of Delaware No Drawing. Application June 20, 1936, Serial No. 86,358

11 Claims. (Cl. 91—68)

This invention relates to new and improved flexible articles and has more particular reference to the production of flexible articles having the character of increased durability and utility and containing an interpolymer of an alpha-substituted acrylic acid ester with other polymerizable organic materials. More specifically, the invention is directed to the production of improved flexible articles in which a suitable base material is impregnated, coated, or imbedded in a plastic substance, an essential constituent of which comprises an interpolymer of a methacrylic acid ester with an acrylic acid derivative or with other methacrylic acid esters.

Flexible articles containing metal, cloth, paper, or similar base materials, have been heretofore coated with compositions consisting mainly of cellulose acetate, pyroxylin, certain acrylic acid derivatives, or the like. These prior articles are exemplified by United States Patents 1,580,287, 1,842,093, 1,842,640, and British Patents 371,812, 373,233, 373,947 and 387,736. Although an enormous amount of work has been done in the production of these and similar prior art articles, the resultant products are far from satisfactory and desirable. For example, these products possess little or no ultra-violet light transmitting properties, involve commercially prohibitive costs in their production, and possess the objectionable disadvantage of being insufficiently flexible unless plasticizer addition is resorted to in their manufacture. The presence of plasticizers is undesirable due to their property of lacking in permanence in the film and equal effectiveness over the ranges of temperature to which the article is usually subjected during use. This is particularly true in instances where outdoor exposure of the article is had and loss of plasticizer incurred, since embrittlement and decomposition of the coating sets in and separation and pulling away of the coating from the base or support results. By this means the attempt at permanent securance between plastic and base is effectively defeated. Exposure of the base material to the elements causes its deterioration to quickly follow, and thus necessitates handling of the article with extreme care due to its relatively fragile condition.

It is among the objects of the present invention to overcome the foregoing, as well as other disadvantages in prior art articles, and to provide flexible articles which combine to a greater extent the desired properties of flexibility and durability; to provide flexible articles which are at once clear and transparent in character; to provide flexible articles which retain their flexibility both during and after prolonged exposure under widely different weather and temperature conditions; to produce an article which is capable of transmitting appreciably greater amounts of ultra-violet light, even after extended use and prolonged outdoor exposure; to provide a plastic material of such character as to be sufficiently flexible for employment as a coating, impregnating or imbedding agent, for base elements or supports of the type mentioned as well as other types, and one which eliminates the necessity of employing plasticizers to induce flexibility; and to provide a flexible article which suffers little or no impairment from prolonged or continuous exposure to adverse weather conditions.

Additional and more particular objects of the invention include the provision of a flexible article having a reinforcing wire mesh base coated or imbedded in a plastic agent, which plastic effectively secures and protects said base, tenaciously and permanently adhering thereto over prolonged periods of time and during and after extended and continuous outdoor exposure. Further and additional objects and advantages of the invention will become obvious from the ensuing description and claims.

The foregoing objects and advantages, as well as others, are attainable in accordance with the present invention which broadly comprises treating a flexible base material with a plastic containing as a constituent thereof an interpolymer of an acrylic acid derivative with a dissimilar polymerizable material. In a more restricted and particular embodiment the flexible base material may be treated or impregnated with a composition comprising an interpolymer of at least two dissimilar acrylic acid derivatives; or, specifically, may comprise treating a wire mesh base material with a plastic containing as an essential constituent thereof an interpolymer of an alpha-substituted acrylic acid ester with an acrylic acid derivative or an alpha-substituted acrylic acid ester.

In its preferred embodiment the invention is directed to the production of flexible articles comprising flexible reinforcing base materials, such as wire mesh or the like, adapted to be suitably imbedded in or coated with a plastic composition containing an interpolymer or interpolymers of methyl methacrylate with a dissimilar acrylic acid derivative, such as other methacrylic acid esters.

Since the physical properties of the interpolymers are not the mean of those of the components, generally the exact composition of the interpolymer in any given case has to be determined experimentally. Thus, interpolymers prepared from methyl methacrylate and octyl acrylate generally contain from 40-60% of methyl methacrylate and from 60-40% of octyl methacrylate, whereas in the preparation of flexible articles from interpolymers containing butyl methacrylate a much higher proportion of the latter must be used.

In order that the invention may be more readily understood, the following specific examples, which are to be considered as in no wise limiting the scope of the invention, are given:

Example 1

A screen composed of woven oval wires was passed through an 1 per cent methyl acetone solution of the produc obtained by interpolymerizing 25 grams of methyl methacrylate with 75 parts of methyl acrylate. The coated article after drying was clear, transparent, and capable of being flexed repeatedly without any evidence of cracking or of separation of the plastic from the wire mesh base.

Example 2

Example 1 was repeated using as the coating composition an 18 per cent methyl acetone solution of the product obtained by interpolymerizing 25 parts of ethyl methacrylate with 75 parts of methyl acrylate. The coated article after drying was clear, transparent, and flexible. Repeated flexing of the coated product failed to cause either separation of the plastic from the wire mesh base or cracking of the coating.

Example 3

Example 1 was repeated using as the coating composition an interpolymer obtained from equal parts of ethyl methacrylate and methoxy-ethyl methacrylate. The coated article after drying was clear, transparent, flexible, and repeated flexing failed to cause either separation of the plastic from the base or cracking of the coating.

Example 4

Example 1 was repeated using as the coating composition an interpolymer obtained from 35% methyl methacrylate and 65% naphthenyl methacrylate. The coated article was clear, transparent, flexible, and repeated flexing failed to produce any cracking or separation of the coating from the base material.

Example 5

A screen composed of woven oval wires was passed through a 30 per cent methyl acetone solution of the product obtained by interpolymerizing a mixture of equal parts of methyl methacrylate and octyl methacrylate. The coated article after drying was clear, transparent, and tough. Repeated flexing failed to bring about either separation of the plastic from the wire mesh or cracking of the coating.

As stated, it is to be understood that the foregoing examples are merely illustrative of specific instances wherein the invention may be carried into effect, and that the same are subject to many modifications without departure from the spirit or scope of such invention. For example, in lieu of the methyl, ethyl, octyl, methoxyethyl, and naphthenyl methacrylates of the examples, other readily polymerizable esters of alpha-alkyl, aryl, and aralkyl substituted acrylic acids, such as alpha-ethyl acrylic acid, alpha-propyl acrylic acid, alpha-isopropyl acrylic acid, alpha-amyl acrylic acid, alpha-phenyl acrylic acid, alpha-cyclohexyl acrylic acid, alpha- (methylcyclohexyl) acrylic acid, and alpha- (methylphenyl) acrylic acid, etc., may be used.

It is to be understood, of course, that although as the alpha-substituted acrylic acid ester ingredient of the interpolymer any monohydric or polyhydric alcohol ester of the alpha-substituted acrylic acids hereinabove mentioned may be employed, the esters of alpha-methyl acrylic acid have been found preferable because these have in general given the best results. The other ingredient of the interpolymer may be any polymerizable organic compound of the general formula

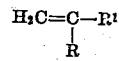

where R is hydrogen, or halogen, or an alkyl, aryl or aralkyl radical, and $R^1$ is aryl or a radical of the formula

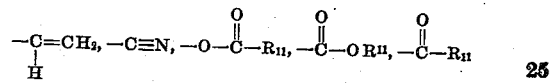

where $R^{11}$ is an alkyl, alkoxy alkyl, or carbocyclic radical, such as an aryl, aralkyl, or hydroaromatic radical. Examples of specific compounds coming within the scope of the general formula are the vinyl esters, e. g. vinyl acetate, methyl vinyl ketone, styrene, etc., isoprene, butadiene, chloro-2-butadiene-1,3, acrylic nitrile, or any acrylic acid ester such as methyl and ethyl acrylates, cyclohexyl acrylate, tetrahydro- and decahydro-naphthyl acrylates, ethoxyethyl acrylate, etc.

The surprising discovery has been made that if the monomeric substances are first blended in any proportion whatsoever and the mixture then polymerized, the films produced from such interpolymers possess their own set of properties which are different from those of the component polymers, but to a certain extent dependent on each.

The polymeric substances to which the present invention relates are preferably interpolymers of methacrylic acid esters with each other or with other polymerizable organic compounds, e. g., acrylic acid derivatives, vinyl esters, etc., the interpolymers of which, as will be shown hereinafter, are entirely different in their properties from simple mechanical mixtures. Thus, if solutions of unlike polymers of either the same or different classes of compounds are mixed and the solvent allowed to evaporate, the resulting film is generally non-homogeneous due to incompatibility of the components. On the other hand, if the monomers are mixed and the mixture polymerized the resulting polymer is clear, homogeneous, and probably consists of molecular chains in which both monomers are joined at random in each chain. In this instance the individually different molecules of the two monomers have become one and the same molecule in the polymer. Such a molecule has its own set of properties, different from those of either of the component polymers but dependent on each. In these interpolymers the components are united by primary valencies and consequently are true chemical compounds. On the other hand, blends of separately prepared polymers are simple mechanical mixtures. That this is actually the case is shown by the fact that the interpolymer from methyl methacrylate and acrylic nitrile is homogeneous and is superior to polymeric methyl methacrylate in mechanical strength and flexibility. Polymeric acrylic nitrile is insoluble in monomeric methyl methacrylate. Interpolymers from ethyl methacrylate and acrylic nitrile are similar in their mechanical properties to the methyl methacrylate-acrylic nitrile interpolymers, a most surprising result in view of the difference in properties between methyl and ethyl methacrylate polymers. This result illustrates that the properties of an interpolymer can not be precisely predicted from a knowledge of the properties of the component polymers.

Films cast from solutions of the product obtained by polymerizing a mixture of equal parts of methyl vinyl ketone and methyl methacrylate are clear, transparent and tough, whereas films cast from blends of solutions of the separately prepared polymers are rough, cloudy, and lacking in mechanical strength, indicating lack of compatibility of the component polymers. This result further illustrates that the interpolymers are not mere mixtures, but are actually new chemical entities possessing their own individual set of properties. This is further confirmed by the marked differences in solubility characteristics brought about by variations in the compositions of the interpolymers. Thus, interpolymers containing from 10 to 20% of methacrylyl urea and 80-90% of methyl methacrylate are soluble in the common organic solvents. In contrast, polymeric methacrylyl urea itself is insoluble in the common organic solvents, but soluble in dilute alkali solutions. Interpolymers containing 80% of methacrylyl urea and 20% methyl methacrylate are soluble in dilute alkali, but insoluble in common organic solvents. In contrast, polymeric methyl methacrylate is soluble in organic solvents but insoluble in alkalis. Films cast from solutions of these interpolymers are clear and transparent. Blends of the separately prepared polymers cannot be made because of the marked differences in solubility characteristics of the components.

From the foregoing it is evident that by polymerizing together suitably selected components and by varying the proportions thereof, products of widely divergent properties to meet specific needs may be obtained. By this procedure the necessity of adding extraneous material, such as plasticizers, to modify the properties of the products, is avoided.

In the embodiments illustrated in the specific examples, the wire mesh may be suitably coated by passing the same through solutions containing the interpolymer and the solvent then allowed to evaporate. Alternatively, the wire mesh base material may be passed through a bath of fused interpolymers; in still another alternative method the interpolymer may be formed into a plastic sheet which may then be attached to the flexible base material through the application of heat and/or pressure, by means of a suitable cement, or some other related method of causing adhesion between the base member and the coating material. As a still further alternative procedure for applying the aforementioned interpolymers to the base member, the interpolymers may be employed in the form of a powder, which may be applied in a relatively uniform layer to the base material, and finally effecting union of the base material with the interpolymer powder through the application of heat and/or pressure; or, if desired, the base member may be passed through aqueous dispersions of the interpolymers.

In the coating of flexible wire mesh articles of the present invention it will be found preferable to coat the wire mesh with a solution of the interpolymer and then to dry the coated products at a temperature ranging from about 60-100° C. It may sometimes be advantageous, however, to coat the wire mesh with a solution of the partially-polymerized mixed materials and to complete polymerization in situ with the aid of light, heat, pressure, catalysts, etc. This latter procedure is particularly applicable to compositions which tend to become insoluble upon polymerization.

In most instances any desired or ordinary organic solvent such as benzene, toluene, xylene, dioxane, chlorobenzene, ethylene dichloride, chloroform, acetone, etc. may be employed in preparing the solutions utilized in coating the flexible base materials contemplated by the present invention. In most instances a concentration of solution in the range of 15-40% resin content will be found satisfactory.

When selecting the wire mesh to be coated, considerable latitude may be exercised. For instance, the wires may be woven, or may be soldered, brazed, or welded together. Furthermore, these wires may be dull galvanized or otherwise treated and may be produced from copper, iron, steel or any other metal or alloy which is capable of being fabricated in the form of a wire mesh. Before or after fabrication the metal or metal alloy may be hot or cold galvanized or otherwise chemically and/or mechanically treated. For optimum results, it is ordinarily advisable to select wire meshes, the individual wires of which in whole or in part have a substantially oval cross-section. This type of cross-section has been found to be more satisfactory in a base material than round or flat wires. However, the invention is not restricted thereto, since it is equally applicable to round and/or flat wires as these may be used in place of the oval wire or in combination therewith. Also, it is to be understood that the invention is not restricted to any particular form of wire, manner of weaving or joining individual wires, nor to the chemical and physical composition of such materials, since it is contemplated that it may be applied to all wire meshes regardless of how the aforementioned characteristics may vary.

Although the compositions resulting from the employment of the present invention will be found per se sufficiently flexible for use in the fabrication of the coated or flexible articles of the present invention, it is conceivable that in some instances it may be desirable to incorporate one or more plasticizers therein, depending upon the nature of the base material, and extent or character of use to which the flexible article is to be subjected. Accordingly, in such instances, suitable plasticizers may be employed in conjunction with the interpolymers of the present invention, among which may be mentioned the phthalates such as diethyl, dipropyl, di-isopropyl, dibutyl, etc.; dicyclohexyl, dibenzyl, dicyclohexylbutyl, benzylbutyl, etc.; esters of aliphatic dibasic acids such as those of succinic, fumaric, tartaric, adipic, and sebacic acids; esters of monobasic acids such as levulinic, lauric, benzoic, benzoylbenzoic, etc.; esters of polyhydric alcohols including esters of glycol and glycerol, e. g., glycol benzoate, triacetin, diacetin, acetin, etc.; substituted amides such as tetraethyl phthalamide, tetrabutyl succinamide, etc.; cyclic ketones such as camphor and beta-naphthanone; lactones such as phthalide, hydrocarbons such as dixylyl ethane; halogenated hydrocarbons such as chlorinated diphenyls; diphenyl ethers such as dicresoxyethyl ether; and also non-drying and semi-drying oils.

If desired, the interpolymers of the present invention may be suitably chlorinated, thereby effecting a reduction in cost as well as improvement in fire resistance in the finished article.

The present invention is directed broadly to the production of reinforced flexible articles by coating or imbedding a base material such as a wire mesh, or the like, in an interpolymer of an alpha-substituted acrylic acid ester with an acrylic acid derivative or with other alpha-substituted acrylic acid esters. One of the outstanding features of these interpolymers is that they are permanently flexible in character, and therefore free of the objectionable defect inherent in prior products, namely, that of losing flexibility through loss of plasticizer upon aging. While the production of these articles is frequently considered to be relatively simple, there are many important features which must be carefully observed in order to effect the production of a satisfactory product. These features are little known and undoubtedly explain many of the faults attributed to flexible coated or impregnated reinforced articles now available to the public. For example, the coating material must cling tenaciously to the underlying metallic base material, and this regardless of temperature conditions. In other words, the coating material must be capable of contracting and expanding with the base material and must retain this property even after prolonged continuous exposure to weather. Not only must the coating composition possess this property but it must also be capable of resisting ordinary and extraordinary weather conditions. It should not flow upon exposure to the summer sun nor become brittle, deteriorate, and shatter when exposed to low temperatures. It must not be affected by rain or the mild acids present in the atmosphere, and should be capable of withstanding rough handling. Further, it must be permanently flexible, tough, transparent to ordinary and to ultra-violet light, and should be entirely free of any surface tackiness.

While many well-known plastics may possess some of these properties, it has been found that none possesses all of these properties to the required extent. The interpolymers described herein possess these properties to a surprising extent and are therefore a very marked advance over any other plastic heretofore used for this purpose. While the various plastics comprised within the scope of this application possess these properties to a greater extent than cellulose acetate (which was previously customarily used for this purpose), it has been found that the interpolymers of methyl methacrylate with acrylic acid esters are outstandingly better than any of the remaining compositions. These interpolymers possess such new and unique properties as to set them apart among the products useful in the production of sheeted reinforced wire mesh materials.

While various solvents, plasticizers and softening agents have been mentioned as utilizable in the production of the plastic comprising the present invention, other types of such material, as more specifically and particularly set out in the co-pending application of Daniel E. Strain for Flexible articles, filed December 29, 1934, Serial No. 759,744 now Patent No. 2,046,886, are also contemplated as utilizable in the present invention.

The interpolymers employed in the present invention may be produced either by direct interpolymerization or by the ester interchange procedure disclosed in the co-pending application of H. J. Barrett, Serial No. 50,711, filed November 20, 1935.

As many apparently widely different embodiments of the invention may be made without departing from its spirit and scope, it is to be understood that the invention is not limited to the specific embodiments hereinbefore set out, except as defined in the appended claims.

I claim as my invention:

1. A method for producing flexible articles comprising treating a metallic base material for said articles with an interpolymer of a monomeric alpha-substituted acrylic acid ester with a different monomeric polymerizable compound of the general formula

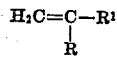

where R is a member of the class consisting of hydrogen, halogen, alkyl, aryl, and aralkyl radicals, and $R^1$ is a member of the class consisting of aryl and a radical of the formula

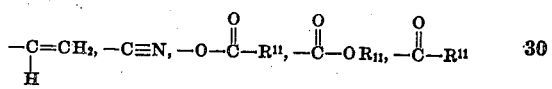

where $R^{11}$ is a member of the class consisting of alkyl, alkoxy alkyl, aryl, aralkyl and hydroaromatic radicals.

2. A method for producing flexible articles comprising treating a wire mesh base material for said articles with a polymerized mixture of a monomeric ester of alpha hydrocarbon substituted acrylic acid and a monomeric acrylic acid ester.

3. A method for producing flexible articles comprising treating a flexible wire mesh base material with an interpolymer of monomeric methyl methacrylate with a monomeric acrylic acid ester.

4. A method for producing flexible articles comprising treating a flexible wire mesh base material forming a constituent part of said article with an interpolymer of monomeric methyl methacrylate with a different monomeric methacrylic acid ester.

5. A method for producing flexible articles comprising treating a woven wire mesh base material with a solution containing interpolymer of a monomeric alpha-substituted acrylic acid ester with an acrylic acid ester.

6. A flexible article comprising a flexible metallic base treated with a polymerized mixture of a monomeric alpha substituted acrylic acid ester with a different monomeric polymerizable compound of the general formula

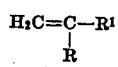

where R is a member of the class consisting of hydrogen, halogen, alkyl, aryl and aralkyl radicals, and $R^1$ is a member of the class consisting of aryl and a radical of the formula,

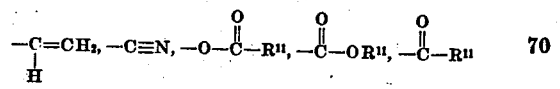

where $R^{11}$ is a member of the class consisting of alkyl, alkoxyalkyl, aryl, aralkyl, and hydroaromatic radicals.

7. A flexible wire mesh article comprising a flexible base material coated with an interpolymer of a monomeric methacrylic acid ester and an additional monomeric methacrylic acid ester.

8. A flexible article comprising a metallic mesh base material coated with an interpolymer of monomeric methyl methacrylate with monomeric methyl acrylate.

9. A flexible article comprising a wire mesh base material coated with an interpolymer of monomeric ethyl methacrylate with monomeric methyl acrylate.

10. A flexible article comprising a woven wire mesh base material coated with an interpolymer of methyl methacrylate and octyl methacrylate.

11. A flexible article comprising a wire mesh base material coated with an interpolymer of methyl methacrylate with octyl methacrylate, said methyl methacrylate units constituting 40 to 60% of said interpolymer and said octyl methacrylate units constituting 60 to 40% of the interpolymer.

GEORGE B. BRADSHAW.